(12) United States Patent
Contell Albert et al.

(10) Patent No.: US 12,193,469 B2
(45) Date of Patent: Jan. 14, 2025

(54) FRUIT SQUEEZING SYSTEM

(71) Applicant: ZUMMO INNOVACIONES MECANICAS, S.A.U., Moncada (ES)

(72) Inventors: Eugenio Contell Albert, Moncada (ES); Antonio Calatayud Maset, Moncada Valencia (ES); Jorge Martinez Roca, Moncada Valencia (ES)

(73) Assignee: ZUMMO INNOVACIONES MECANICAS, S.A.U., Moncada (ES)

( * ) Notice: Subject to any disclaimer, the term of this patent is extended or adjusted under 35 U.S.C. 154(b) by 716 days.

(21) Appl. No.: 17/440,770

(22) PCT Filed: Mar. 18, 2019

(86) PCT No.: PCT/ES2019/070174
§ 371 (c)(1),
(2) Date: Sep. 18, 2021

(87) PCT Pub. No.: WO2020/188126
PCT Pub. Date: Sep. 24, 2020

(65) Prior Publication Data
US 2022/0175010 A1 Jun. 9, 2022

(51) Int. Cl.
*A23N 1/00* (2006.01)
*A23N 1/02* (2006.01)

(52) U.S. Cl.
CPC .............. *A23N 1/003* (2013.01); *A23N 1/02* (2013.01)

(58) Field of Classification Search
CPC ............ C12Q 1/6827; C12Q 2565/125; C12Q 2565/501; A23N 1/003; A23N 1/02; A47J 19/023; A47J 19/02

(Continued)

(56) References Cited

U.S. PATENT DOCUMENTS

| | | | |
|---|---|---|---|
| 4,479,424 A | 10/1984 | Carroll | |
| 5,249,516 A * | 10/1993 | Pastor | A23N 1/003 99/507 |
| 2008/0028943 A1* | 2/2008 | Lee | A47J 19/02 700/232 |

FOREIGN PATENT DOCUMENTS

| | | |
|---|---|---|
| CN | 105982500 A | 10/2016 |
| ES | 2545235 A1 | 9/2015 |
| ES | 1196358 U | 11/2017 |

OTHER PUBLICATIONS

International Search Report and Written Opinion for corresponding application PCT/ES2019/070174 dated Nov. 13, 2019 and English translation.

* cited by examiner

*Primary Examiner* — Dana Ross
*Assistant Examiner* — Joseph W Iskra
(74) *Attorney, Agent, or Firm* — LUCAS & MERCANTI, LLP

(57) ABSTRACT

A fruit squeezing system, with a feed system and cutting and squeezing devices with a pair of cup assemblies that are vertically displaceable by vertical displacement device and rotationally, in opposite directions, by rotation device; below these a cutting assembly with a blade and peel extraction device; and one pair of fixed squeezer balls, each of these below one of the cup assemblies, for the vertical squeezing of the fruit halves by the vertical displacement of the cup assemblies. The system has a first motor exclusively for the operation of the vertical displacement device; device for the measurement of the intensity thereof, and a control unit which independently governs the first motor and halts it when the intensity measured exceeds a pre-set range of values.

14 Claims, 12 Drawing Sheets

(58) Field of Classification Search
USPC .......................................................... 99/509
See application file for complete search history.

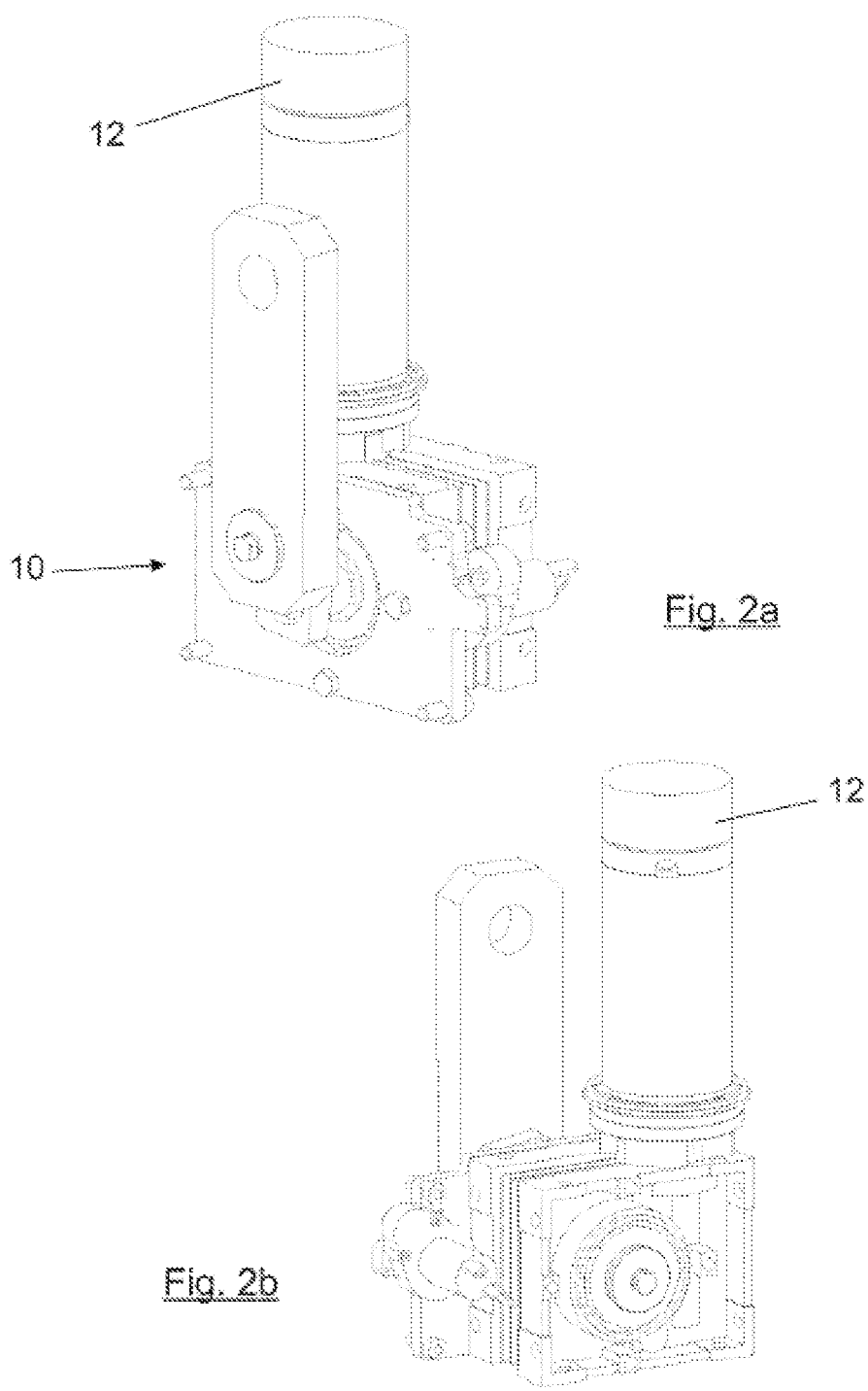

FRUIT SQUEEZING SYSTEM

CROSS REFERENCE TO RELATED APPLICATION

This Application is a 371 of PCT/ES2019/070174 filed on Mar. 18, 2019, which is incorporated herein by reference.

FIELD OF THE INVENTION

The present invention belongs to the technical field of the agri-food industry, and specifically to the field of fruit squeezing machines, mainly for oranges, but also for other citrus fruits and pomegranates. More specifically, the invention relates to fruit squeezing systems with rotating cups for receiving the fruit, a blade for cutting the fruit into two halves, and squeezer balls for these halves, which perform vertical squeezing, i.e. a vertical movement of the cups containing the fruit halves on the squeezer balls to perform the squeezing.

BACKGROUND OF THE INVENTION

Various automatic fruit squeezing machines, mainly for oranges, but also for other citrus fruits, are known from the state of the art. These machines are mainly based on the movement of the fruit so that the fruit is cut and the resulting parts are then squeezed.

In general, most industrial and large capacity squeezers, or those used in the hostelry industry and the like, extract the juice by a simultaneous and coinciding rotating movement of some alveoli or cups with some pinecones or squeezer balls corresponding to them.

ES2091702B1 shows a citrus fruit squeezing machine which incorporates a "revolving" system with a large loading capacity where oranges and other fruits are placed. This machine already incorporates a mechanism to squeeze each one of the fruits, performing the juice extraction by a vertical displacement in which each one of the fruit halves located in its corresponding place will be pressed on the respective pinecone or squeezer ball.

PCT/ES2012/070394 shows a fruit squeezing machine in which the fruit is cut into two equal halves by rotating the cups that hold the fruit in a symmetrical way. The cups face and compress these halves against squeezer balls, collecting the juice on one side, and the peel of the squeezed fruit on the other.

Spanish Patent Application P201230986 shows a fruit squeezing machine with a reduced size compared to conventional machines, which allows its installation in premises with less available space. This machine has a single cup for receiving the fruits and a single squeezer ball, which makes it occupy less space, but on the other hand allows lower speed than other machines with different systems of several cups and balls.

ES2545235B1 shows a fruit squeezing machine with a vertical squeezing by cups and balls, in which all the elements are driven by a single motor, and the movements of all the components for cutting and squeezing are synchronized with the continuous movement of the fruit feeder.

All these squeezing systems have various limitations, among which is the impossibility of adapting them to any type of fruit, with different characteristics such as size, peel thickness, hardness, etc. In fact, these systems have a single motor for the movement of all components, so they provide a single way of squeezing, rigid, which is not suitable for all types of fruit, precisely because of this variation in the different characteristics. Depending on the size, hardness, thickness of the peel, quantity of pulp, etc., an excessive pressure can cause the peel to break or be squeezed, or on the contrary, if the pressure is insufficient, the juice will remain unpressed. To solve this problem, some machines allow to vary manually the space between the cups and squeezer balls, to increase or reduce it depending on the size of the fruit, or hardness or thickness of the peel, but this is an inefficient solution, which involves handling mechanical parts of the machine by the user continuously, risk of breakdowns, breakage, downtime, etc., which prevents being able to process any fruit in a continuous and flexible way, with a satisfactory performance, in an adequate time.

In addition, since all components are driven by a single motor, and the movements of all components are synchronized by mechanical elements, mechanical failures, jams, etc. occur and affect the entire machine, since a problem in the movement of one component blocks all the others. Another problem with these systems driven by a single motor is that they provide a vertical squeezing path that is always the same, so that for fruits of different sizes and hardness, the pressure must be adjusted by supplements that limit the squeezing path, which can cause jams, failures and breakdowns. Moreover, due to the same vertical squeezing path, some fruits may remain unpressed, and on the contrary, other fruits may be squeezed too much, including the peel, which will make the juice obtained bitter.

It was therefore desirable to have an automatic fruit squeezing machine that would provide juice quickly and efficiently, by means of an intelligent squeezing system that automatically adapts to different types of fruit, and that would squeeze the fruit in an optimal way by adapting to the size and thickness of the peel, thus avoiding the disadvantages existing in the previous machines of the state of the art.

DESCRIPTION OF THE INVENTION

The present invention solves the problems existing in the state of the art by a fruit squeezing system, which is considered intelligent because it allows any squeezing machine to perform a vertical squeezing of any fruit, adapting itself to the characteristics of the fruit, such as size, hardness, thickness of the peel, quantity of pulp, etc., and can vary certain operating parameters according to such characteristics of the fruit. In other words, in this case, intelligent squeezing means squeezing in which the system varies certain operating parameters that allow vertical squeezing of any fruit, adapting to its characteristics, such as its size, hardness, thickness of the peel or quantity of pulp.

In addition, the user can access the system control unit through a simple interface to modify certain parameters such as speed and squeezing power in order to adapt to different circumstances, providing a versatile system.

This intelligent system will additionally allow to reduce malfunctions by detecting blockages and stopping the machine automatically, as well as avoiding no-load squeezing movements of the machine.

The fruit squeezing system has a fruit feeding system, cutting and squeezing means arranged under the feeding system, and a tray for collecting the juice obtained from the fruit arranged under the cutting and squeezing means, which in turn has a filter for collecting pulp and seeds, preventing them from falling into the juice extracted from the fruit.

The cutting and squeezing means have a pair of fruit receiving cup assemblies, displaced vertically by vertical displacement means and rotatably by rotational displacement means. The cutting and squeezing means also have a cutting and extraction assembly under the cup assemblies, which in turn consists of a central blade for cutting the fruit into two halves, and peel extraction means after the fruit has been squeezed. Additionally, the cutting and squeezing means have a pair of fixed squeezer balls, each arranged under one of the cup assemblies, which perform vertical squeezing of the fruit halves by vertical displacement of the cup assemblies on said squeezer balls.

By means of this configuration, one of the cut assembly receives the fruit from the feeding system, and by turning the assemblies in opposite directions towards the interior of the system, the fruit remains between two opposite cups, which direct it with the turn towards the cutting and extraction assembly, in which the blade cuts the fruit into two substantially equal halves, each of them remaining in the cup of one assembly. The assemblies then continue to rotate until the cups with the halves are arranged vertically in the system. From this position, by a vertical downward movement on the squeezer balls of the cup assemblies and of the cutting and extraction assembly dragged by them, the pulp is squeezed out. When the squeezing is finished, the system stops the vertical downward movement and makes an upward movement, in which the peel extraction means perform the extraction of the peel from the squeezer balls. Depending on the number of cups, of the assemblies, at the same time that the squeezing is taking place, other cups in another position will be receiving fruits, which will provide continuity to the process. In the operation of the system, the previous movements and positions are repeated continuously for all pairs of cups of both assemblies.

Both the cups and the squeezer balls are removable and interchangeable, there are different sizes adaptable to different sizes of fruit.

The fruit squeezing system has a first motor which exclusively drives the vertical displacement means of the cup assemblies, i.e. the said first motor solely and exclusively drives the said vertical displacement means of the cup assemblies, starting them up, stopping them, with a given intensity, and providing a given speed to the vertical displacement means of the cup assemblies. Additionally, the fruit squeezing system has means for measuring the intensity generated in the first motor by the driving of the vertical displacement means of the cup assemblies, and a control unit to which the first motor and the intensity measuring means are connected, configured to independently control the first motor.

According to different particular embodiments of the system, the control unit will be configured to stop the first motor when the measured intensity is higher than a preset value. Specifically, this preset value can be set according to the intensity required to squeeze the pulp. This means that when the system detects that the intensity of the first motor is higher than this preset value, it means that the squeezer ball has reached the peel, and at that moment the cup will stop its vertical downward movement for squeezing, avoiding squeezing the peel.

In addition, this feature can also constitute a blockage detection and warning. When an unusually high intensity is detected, outside a set maximum value, depending on the position, it is because the vertical downward squeezing movement is being blocked by some reason, and this vertical movement will be stopped.

Alternatively, according to another particular embodiment, the control unit may be configured to stop the first motor when the measured intensity is less than a preset value. In this case a minimum intensity value of security will be set, which implies that the vertical squeezing is being done without fruit, without load, so the vertical movement will also be stopped.

Preferably, the control unit may vary the current intensity of the first motor and the speed which it provides to the vertical displacement means of the cup assemblies, i.e. the speed at which the cup assemblies perform vertical squeezing of the fruits on the squeezer balls.

This provides an intelligent squeezing with a control of the path and pressure exerted by the cups through the measured intensity, so that only the pulp of the fruit is squeezed until it reaches the peel, without crushing it, regardless of its thickness, which provides higher quality juice and optimizes the performance.

In addition, an adaptation of different parameters such as position, speed, squeezing pressure, number of squeezing movements (vertical descents of the cups on the balls) is achieved.

This independent motor therefore avoids the manual mechanical adjustment of the distance between cups and balls for fruits with different sizes, and different hardness and thicknesses of peel. In this way the system regulates itself to get the maximum performance from the fruit.

Another advantage of this system is that as the path of the cups is until the machine finishes squeezing the pulp, the upper level of all the ball sizes can be equalized, so that the smaller the ball size, the shorter the squeezing path of the cup assemblies, so that the system of the present invention, as the size of the cups and balls decreases, is faster.

According to a particular embodiment of the invention, the fruit squeezing system has a second motor which exclusively drives the rotation means of the cup assemblies, that is to say, said second motor solely and exclusively drives said rotation means of the cup assemblies, starting them, stopping them, with a given intensity, and providing a given rotation speed to the rotation means of the cup assemblies. Additionally, the fruit squeezing system has means of measuring the intensity generated in the second motor by the driving of the rotation means of the cup assemblies. As in the case of the first motor, in this case the second motor and the intensity measuring means are connected to the control unit, which is configured to independently control the second motor, and stop the second motor when the measured intensity exceeds a preset value. This will serve as a means of detecting possible blockages of the cup rotation by any element. If during the rotation there is a peak of intensity with a value well above a preset value, it is because there is some element blocking the rotation of the cups, and the second motor will stop this rotation of the cups.

Preferably, the control unit may control the current intensity of the second motor and the speed of rotation it provides to the cup assemblies, i.e. the speed at which the cup assemblies rotate to receive the fruits and drive them through the next stages of squeezing.

According to a particular embodiment of the invention, the squeezing system has a filter cleaning assembly for cleaning the filter of the juice collection tray. This filter cleaning assembly consists in turn of a mobile scraper mounted between two end shafts, mounted on the filter. The movement of the scraper along the entire length of the filter pulls pulp and seeds to an existing outlet in the juice collection tray.

Preferably, and in accordance with the above embodiment, the squeezing system has a third motor that exclusively drives the filter cleaning assembly, connected to the control unit, which is configured to independently control said third motor.

According to different particular embodiments, the control unit is configured to stop the third motor when the measured intensity is higher than a preset value. For example, this preset value can be set according to the intensity required to move the filter cleaning assembly dragging a certain quantity of pulp, or seeds considered as "normal." This means that when the system detects that the intensity of the third motor is higher than this preset value, it means that there is a higher quantity of pulp, or seeds, or even pieces of peel, in the filter than those established as "normal." Therefore, this third motor and the control unit also act as a means of detecting possible jamming of the filter, so that the user of the system can solve it.

Preferably, the control unit can control the current intensity of the third motor, the speed it provides to the filter cleaning assembly, and the operating time of said filter cleaning assembly.

This allows a variable pulp filtration system in the juice, so that the user can regulate it according to his preferences.

Thus, different modes of operation could be established. In one of them, for example, the speed of the filter cleaning assembly would be set according to the size of the fruit, so that the larger the fruit, the higher the speed of the assembly. It is also possible to set an operating time depending on the size of the fruit, so that the larger the size of the fruit, the longer the operating time of the assembly. In the systems available in the state of the art, since all the components are driven by the same motor, the filter cleaning assembly operates only while the fruit is being squeezed, and as soon as the squeezing stops, the filter cleaning assembly stops as well. Instead, with the system of the present invention, the squeezing can be stopped, and the filter cleaning assembly can be made to continue to operate for a period of time to ensure that the filter is clean and free of pulp and seeds for the next squeezing, providing greater hygiene.

According to different particular embodiments of the invention, the fruit feeding system may be comprised of a feeder, which is a turntable with various cavities for the individual accommodation of the fruits, and a basket on said feeder where the fruits are contained with a separator and its actuating mechanism to make them drop one by one into the feeder. Alternatively, the feeding system consists of a ramp and dosing element to get the fruits to drop one at a time into the cups.

According to a preferred embodiment of the invention, the squeezing system with the feeding system including the rotating disc-shaped feeder, has a fourth motor that exclusively drives said feeder connected to the control unit, which is configured to independently control said fourth motor. As the feeder is driven by the fourth motor, smooth starts and stops will be made, so the fruits will not be damaged, solving the problem that existed in the machines of the state of the art, in which the start and stop was mechanical (by lever), causing abrupt actions damaging the fruits.

Alternatively, in the case of the feed system comprising the ramp and the dosing element, the fourth motor exclusively drives the dosing element, the control unit being configured to independently control the fourth motor, and with it the movement of the dosing element.

According to a preferred embodiment of the invention, the system presents an interface connected to the control unit, which is configured to select and adjust the operating time, speed and power of each of the motors by the user, in order to adapt the squeezing to different fruits and different needs, thus providing a versatile system for any kind of circumstances. With a display the user will select the type and size of fruit, and the system will automatically adjust the most suitable squeezing parameters.

According to the above, the system has multiple electric motors, each of them controlling different components, and all of them electronically synchronized by the control unit. That is to say, a system with independent, electronic and intelligent control of all its movements is achieved, as opposed to the existing systems in the state of the art, in which a single motor drives all the components, and the movement of all of them is synchronized by means of mechanical elements.

Thus, the system can automatically detect anomalies, blockages or problems in operation, stopping the motors immediately in the event of excessive motor intensity. Detection will occur due to an out-of-range intensity at a certain point, e.g. not corresponding to the squeezing position. This allows detection of incorrect cup or ball configurations, fruit size not in accordance with the installed cup and ball configuration, foreign objects in the squeezing area such as fruit pieces or debris, etc.

By means of the speed settings it is possible to provide different squeezing modes, and thus for example to establish a slower eco squeezing mode, with the intention of obtaining the maximum performance of each fruit, and a faster turbo mode, where speed takes precedence on performance on each fruit (for example, applicable when there is an accumulation of customers).

This results in an automated, versatile and user-friendly system, in addition to providing a high performance.

BRIEF DESCRIPTION OF THE DRAWINGS

In the following, in order to facilitate the understanding of the invention, by way of illustration, but not limitation, an embodiment of the invention will be described with reference to a plurality of figures.

FIG. 2a is a front perspective view of an embodiment of a vertical displacement means of the receiving cup assemblies. FIG. 2b is a rear perspective view of the vertical displacement means of FIG. 2a.

FIG. 6b is a perspective view of the filter cleaning assembly of FIG. 6a.

FIG. 9b shows a bottom perspective view of the power system of FIG. 9a.

FIGS. 10a-10e show schematically the cutting and squeezing movements in different embodiments of the system object of the present invention, so that:

FIG. 10a shows an embodiment with one cup in each assembly in a system with sufficient space for the cutting of the fruit to occur in a single rotation of the cups on the cutting and extraction assembly.

FIG. 10b shows an embodiment with one cup in each assembly where the cutting of the fruit occurs by turning and lowering the cups onto the cutting and extraction assembly.

FIG. 10c shows the fruit cutting system of FIG. 9a, but with two cups in each assembly.

FIG. 10d shows the fruit cutting system of FIG. 9b, but with two cups in each assembly.

FIG. 10e shows the fruit cutting system of FIGS. 9a and 9c, but with three cups in each assembly.

Figure 1A:
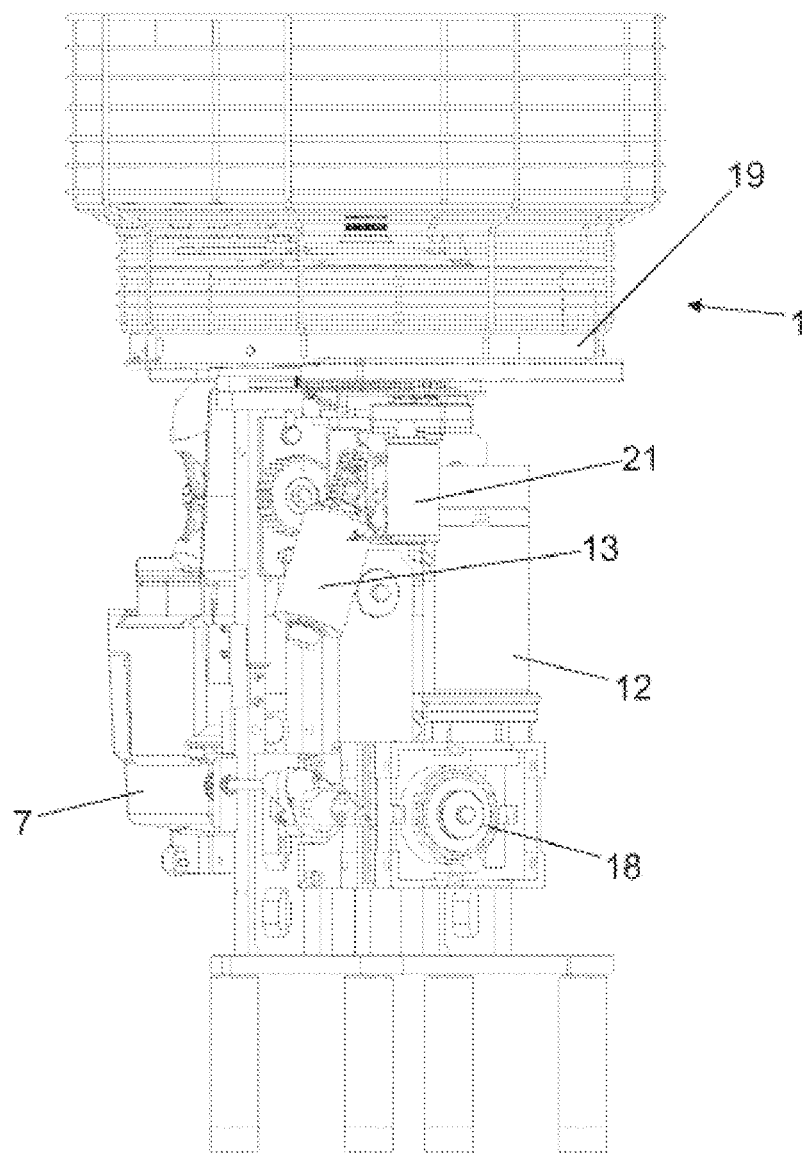
FIG. 1a is a perspective view of the rear of a particular embodiment of the squeezing system, subject of the invention, showing the different independent motors driving the different components.

In these figures reference is made to a set of elements which are:
1. Fruit feeding system
2. fruit
3. cups
4. cutting and extraction assembly
5. blade
6. fixed squeezer balls
7. juice collection tray
8. filter
9. filter cleaning assembly
10. vertical displacement means of cup assemblies
11. rotation means of cup assemblies
12. first motor
13. second motor
14. filter cleaning assembly scraper
15. filter cleaning assembly drive shaft
16. filter cleaning assembly driven shaft
18. third motor
19. turntable feeder
20. feed system ramp
21. fourth motor
22. dosing element of the feeding system
23. peel extraction means
24. feed system basket

DETAILED DESCRIPTION OF THE INVENTION

The object of the present invention is a fruit squeezing system, considered intelligent because it allows any squeezing machine using said system to perform a vertical squeezing of any fruit, adapting itself to the characteristics of the fruit, such as size, hardness, thickness of the peel, quantity of pulp, etc., and can vary certain operating parameters according to said characteristics of the fruit.

As can be seen in the various figures, the fruit squeezing system has a fruit 2 feeding system 1, which may have a turntable feeder 19, or a ramp 20, cutting and squeezing means arranged under the feeding system 1, and a tray 7 for collecting the juice obtained from the fruit 2, which is arranged under the cutting and squeezing means, and which in turn has a filter 8 for collecting pulp and seeds, preventing them from falling into the juice extracted from the fruit 2.

Figure 1B:
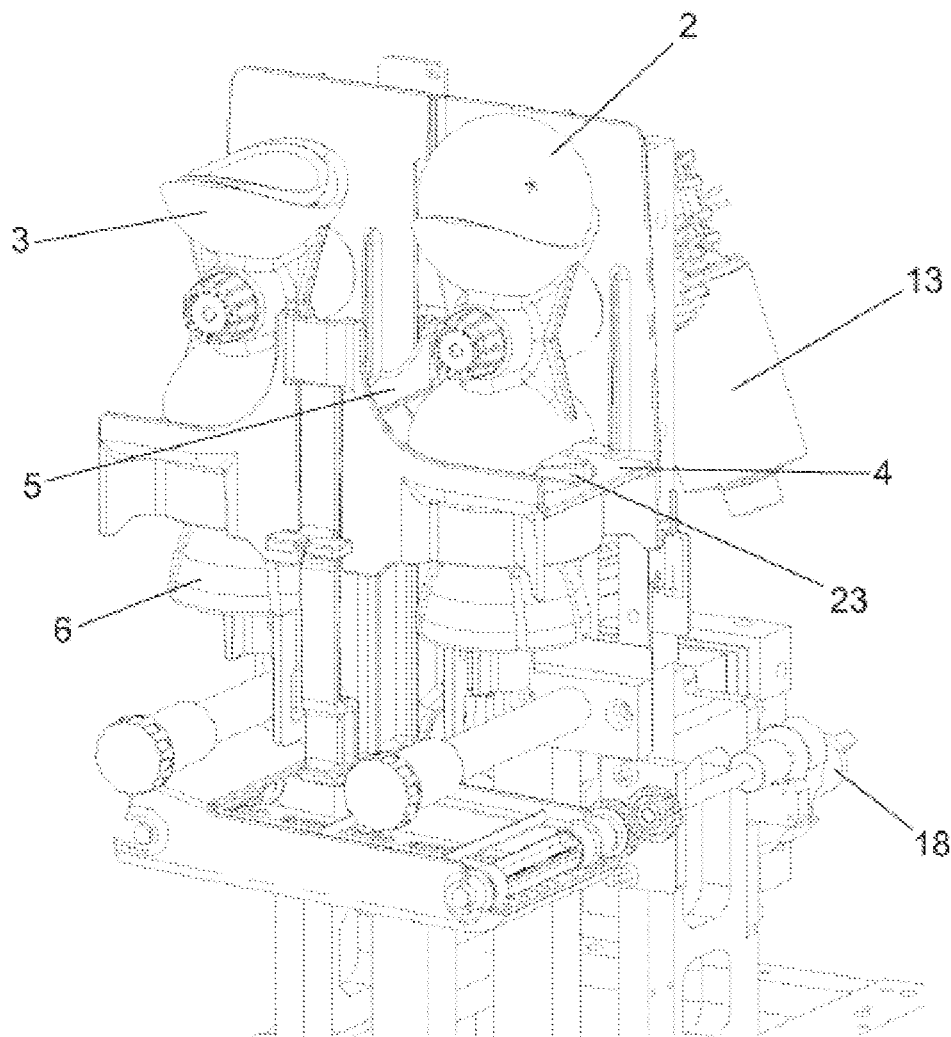
FIG. 1b is a front perspective view of the squeezing system of FIG. 1a, in which some elements have been removed for the sake of clarity.

The cutting and squeezing means have a pair of fruit receiving cup assemblies 3, displaced vertically by means of vertical displacement means 10 and rotatably in opposite directions towards the interior of the system by rotation means 11. Additionally, the cut assemblies 3 can be moved rotatably in opposite directions towards the outside of the system, obviously not for performing the squeezing of the fruits 2, but for positioning movements or positioning of the cups 3, for example when initializing the system. The cutting and squeezing means further present a cutting and extraction assembly 4 under the cup assemblies 3, which in turn comprises a central blade 5 for cutting the fruit 2 into two halves, and peel extraction means 23 after the fruit 2 has been squeezed. This blade 5, in particular, may consist of a progressive blade designed so that the cutting of the peel of the fruit is progressive when the cups rotate, so that it cuts the same length of peel at each advance of the rotary movement of the cup. In this way, the peel of the fruit is not torn during cutting, thus avoiding the presence of essential oils from the peel in the juice, and the remains of torn peels inside the squeezing area of the system. Particularly the peel extraction means 23 may consist of ribs arranged in the cutting and extraction assembly 4, as seen in FIG. 1b. Additionally, the cutting and squeezing means have a pair of fixed squeezer balls 6, each arranged under one of the cup assemblies 3, which perform vertical squeezing of the fruit 2 halves by vertical displacement of the cup assemblies 3 on said squeezer balls 6. FIGS. 1a and 1b show these essential elements of the invention. FIG. 1b shows a double cup embodiment, i.e. an embodiment in which each assembly has two cups 3. However, according to different embodiments, each assembly could have one, two, three, or even five cups, which would increase the fruit 2 processing capacity of the system, and the receiving speed, which would imply in an increase of the squeezing speed.

By means of this configuration, one of the cut assemblies 3 receives the fruit 2 from the feeder 1, and by turning the assemblies in opposite directions towards the interior of the system, the fruit 2 remains between two opposite cups 3, which direct it with the turning or vertical movement towards the cutting and extraction assembly 4, in which the blade 5 cuts the fruit 2 into two substantially equal halves, each of them being in a cup 3 of each assembly. The assemblies then continue to rotate until the cups 3 with the halves are arranged vertically in the system. From this position, by means of a vertical downward movement on the squeezer balls 6 of the cup assemblies 3 and of the cutting assembly 4 dragged by them, the squeezing of the pulp from the fruit 2 occurs. When the squeezing is finished, the system stops the vertical downward movement and makes an upward movement, in which the cutting and extraction assembly 4 performs the extraction of the peels from the squeezer balls. Depending on the number of cups 3 of the assemblies, at the same time that the squeezing is taking place, other cups 3 in the opposite position will be receiving fruits 2, which will provide continuity to the process. In the operation of the system, the previous movements and positions are repeated continuously.

Figure 3A:
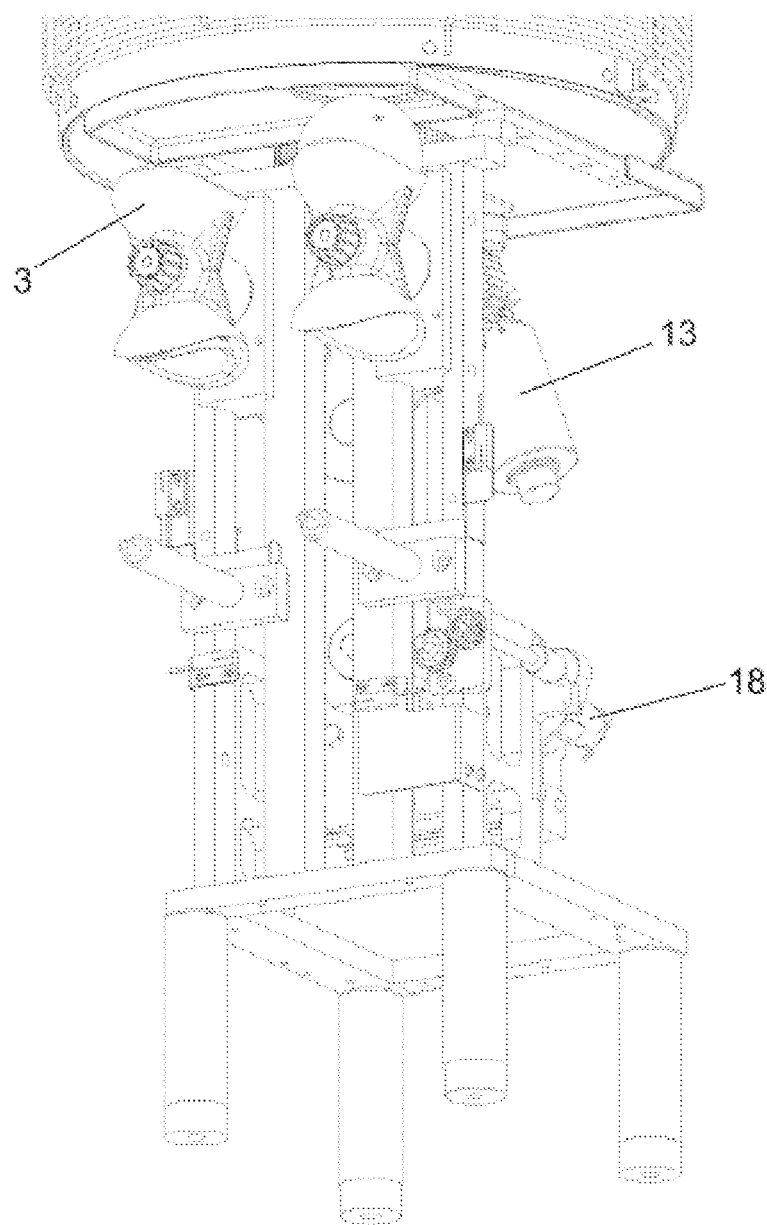
FIG. 3a is a perspective view of an embodiment of a vertical displacement means connected to the receiving cups, and the guides along which the receiving cups are vertically displaced.
Figure 3B:
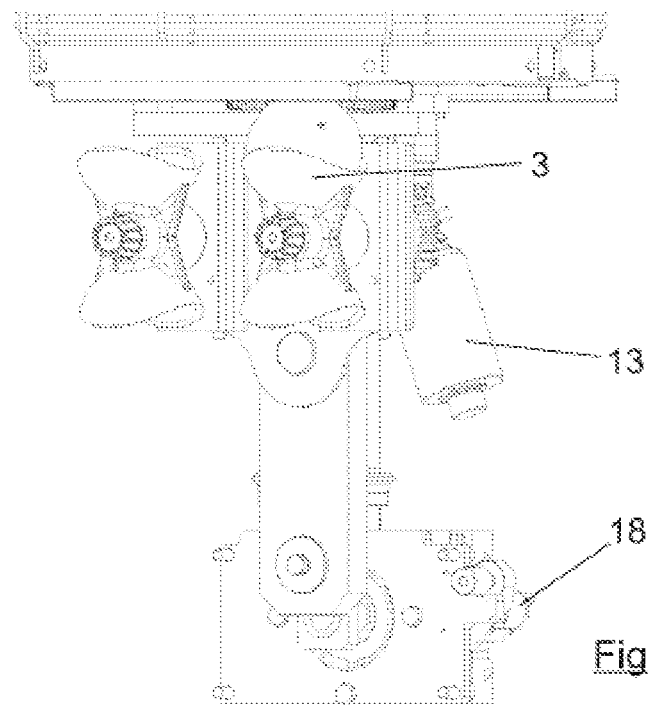
FIG. 3b is similar to FIG. 3a above where the guides have been removed for clarity of the mechanism.

The fruit squeezing system has a first motor 12 which exclusively drives the vertical displacement means 10 of the cup assemblies 3, i.e. the said first motor 12 solely and exclusively drives the said vertical displacement means 10 of the cup assemblies 3, starting them up, stopping them, with a given intensity, and providing a given speed to the vertical displacement means 10 of the cup assemblies. Additionally, the fruit squeezing system presents means for measuring the intensity generated in the first motor 12 by the driving of the vertical displacement means 10 of the cup assemblies 3, and a control unit to which the first motor 12 and the intensity measuring means are connected, configured to independently control the first motor 12, and stop the latter when the measured intensity is outside a preset range of values. FIGS. 2a and 2b show the first drive motor 12 coupled to the vertical displacement means 10, which particularly consist of an actuating arm. FIGS. 1a and 1b show this first motor 12 coupled to the vertical displacement means 10 integrated in the squeezing system. FIGS. 3a and 3b show a partial detail view of the vertical displacement means 10 attached to the cups 3.

According to different particular embodiments of the system, the control unit will be configured to stop the first motor 12 when the measured intensity is higher than a preset value.

Alternatively, according to another particular embodiment, the control unit may be configured to stop the first motor 12 when the measured intensity is less than a preset value.

Preferably, the control unit may vary the current intensity of the first motor 12 and the speed which it provides to the vertical displacement means 10 of the cup assemblies 3, i.e. the speed at which the cup assemblies 3 perform vertical squeezing of the fruits 2 on the squeezer balls 6.

The first motor 12 has two directions, obviously providing two directions of displacement of the vertical displacement means 10 of the cup assemblies 3. Thus, when the squeezing, downward movement of the cut assembly 3 reaches its final position, or stops because it reaches a preset intensity (a sign that it has reached the peel, or a blockage has occurred), the first motor 12 will change direction and the cups 3 will return vertically to their previous position.

Figure 11A:
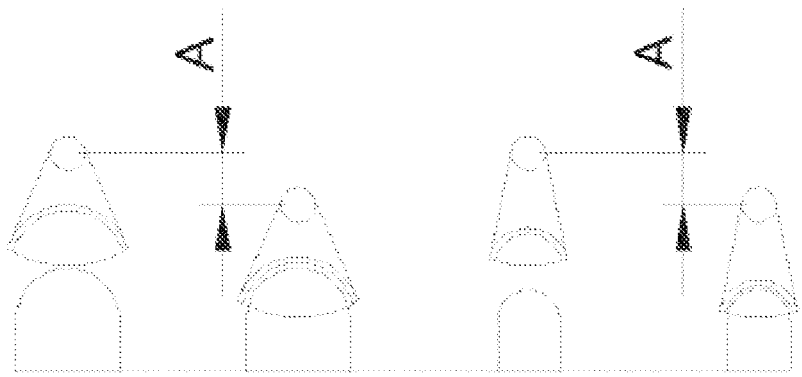
FIG. 11a shows the vertical path of the cups on the balls in the systems of the state of the art, showing two cases for two different sizes of balls and cups.
Figure 11B:
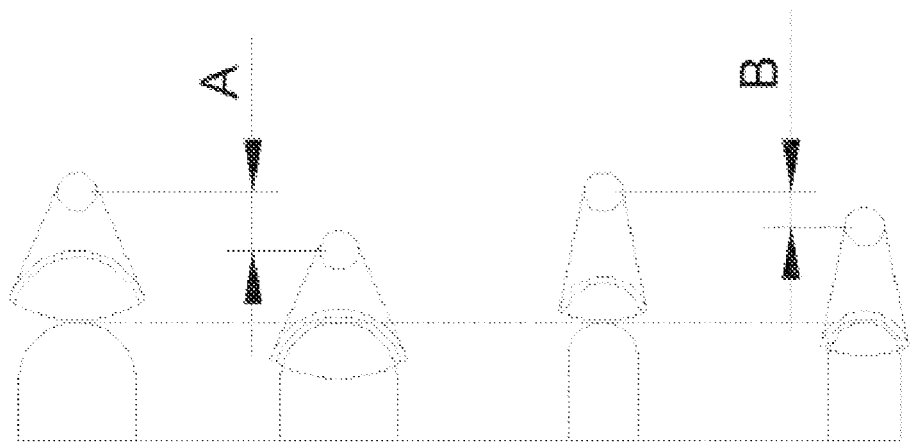
FIG. 11b shows the vertical path of the cups on the balls in the system object of the present invention, showing as in FIG. 10a, two cases for two different sizes of balls and cups.

A further advantage provided by the first motor 12 that exclusively drives the vertical displacement means 10 of the cup assemblies 3 can be seen in FIGS. 11a and 11b. As indicated above, as the path of the cups 3 is until the machine finishes squeezing the pulp, the upper level of all the sizes of balls 6 can be equalized, so that the smaller size of a ball 6, the shorter the squeezing path of the cup assemblies 3, so that the system of the present invention, as the size of the balls 6 decreases, the faster the squeezing path of the cup assemblies 3 becomes. FIG. 11a shows the vertical path of the cups on the balls in the systems of the state of the art, showing two cases for two different sizes of balls and cups. This figure shows that the vertical path A is fixed for different sizes of balls 6. On the contrary, FIG. 11b shows the vertical path of the cups 3 on the balls 6 in the system object of the present invention, showing two cases for two different sizes of balls 6 and cups 3, and in said FIG. 11b it is appreciated that the path B for balls 6 of smaller sizes is much smaller than the path A for balls 6 of larger sizes. Therefore, the system object of the present invention, as it lowers the size of the balls 6 is faster.

Figure 4:
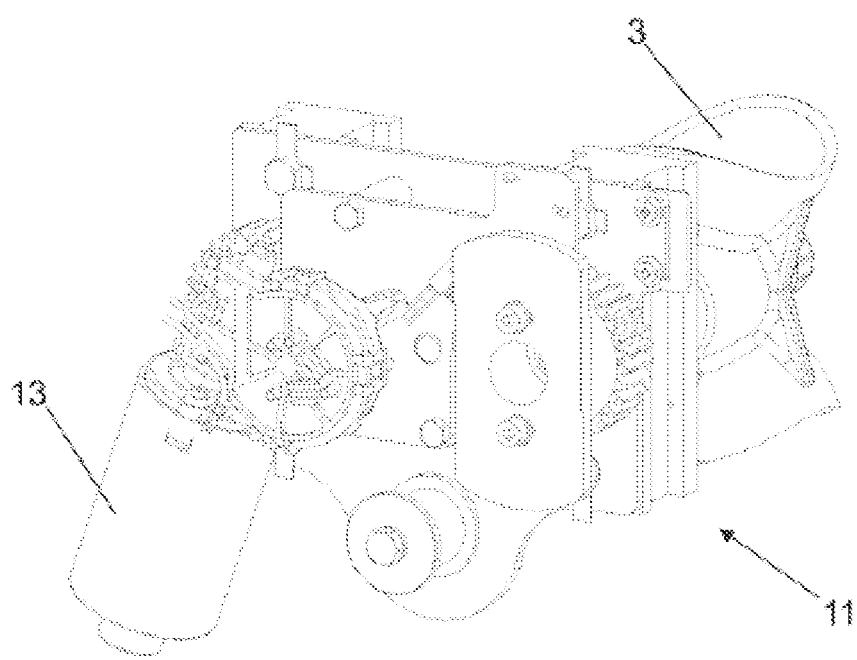
FIG. 4 is a perspective view of an embodiment of a rotation means of the receiving cup assemblies connected to said cups.

According to a particular embodiment of the invention, the fruit squeezing system has a second motor 13 that exclusively drives the rotation means 11 of the cup assemblies 3, that is to say, said second motor 13 solely and exclusively drives said rotation means 11 of the cup assemblies, in such a way as to start them, stop them, with a given intensity, and providing a given rotation speed to the rotation means 11 of the cup assemblies 3. Additionally, the fruit squeezing system presents means for measuring the intensity generated in the second motor 13 by the driving of the rotation means 11 of the cup assemblies 3. The second motor 13 and the intensity measuring means are connected to the control unit, which is configured to independently control the second motor 13, to drive the second motor 13 and to stop the second motor 13 when the rotation is to be interrupted at a preset position according to FIGS. 10a, 10b, 10c, 10d, 10e. FIG. 1a shows this second motor 13 integrated into the squeezing system, and FIG. 4 shows a detail view of the second motor 13 attached to the rotation means 11 and the cup assemblies 3. As can be seen in this figure the rotation means consist of a gear system of gearwheels, which is driven by the second motor 13.

Preferably, the control unit will be able to vary the current intensity of the second motor 13 and the speed of rotation which the latter provides to the cup assemblies 3 for receiving the fruits 2 and driving the latter through the following phases of the squeezing.

Figure 5A:
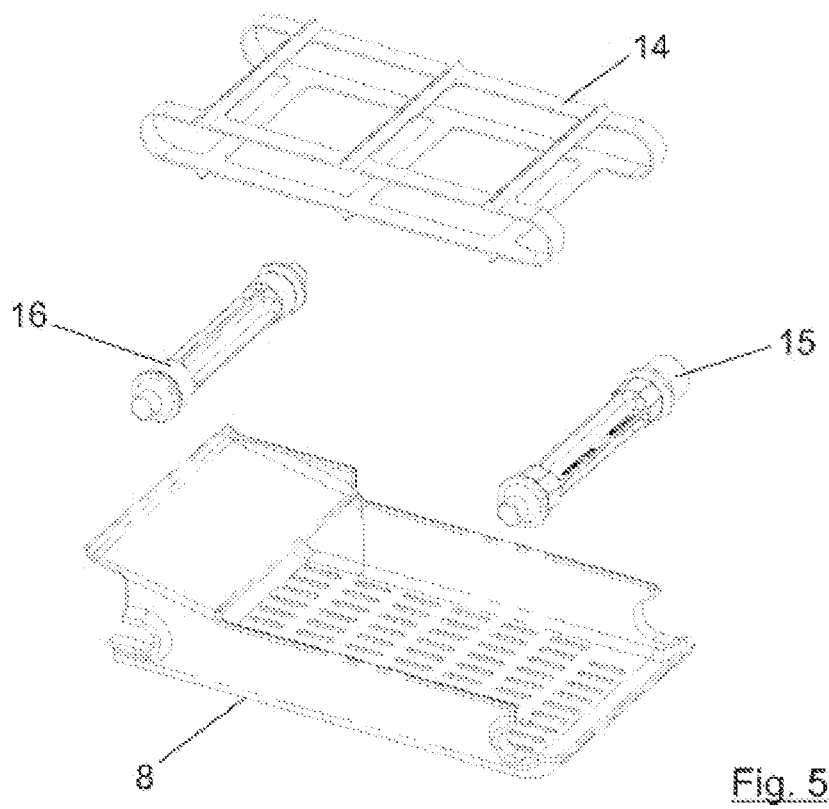
FIG. 5a is an exploded view of a particular embodiment of the filter and a filter cleaning assembly.
Figure 5B:
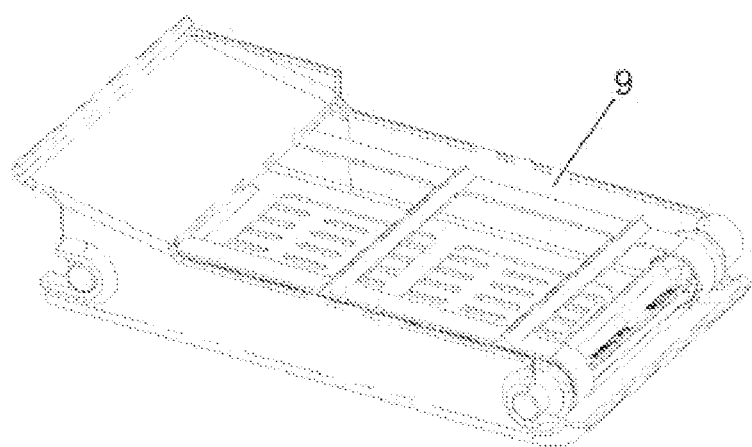
FIG. 5b shows the filter elements and the filter cleaning assembly of FIG. 5a mounted.

In particular, the squeezing system has a filter cleaning assembly 9 for cleaning the filter 8 of the juice collection tray 7. According to a particular embodiment, the filter cleaning assembly 9 has a movable scraper 14 which is mounted between two end shafts, a drive shaft 15 and a driven shaft 16, mounted on the filter 8. The movement of the scraper 14 along the entire length of the filter 8 pulls pulp and seeds to an outlet of the juice collection tray 7. An example can be seen in FIGS. 5a and 5b, which show a particular embodiment of the filter cleaner 9.

Figure 6A:
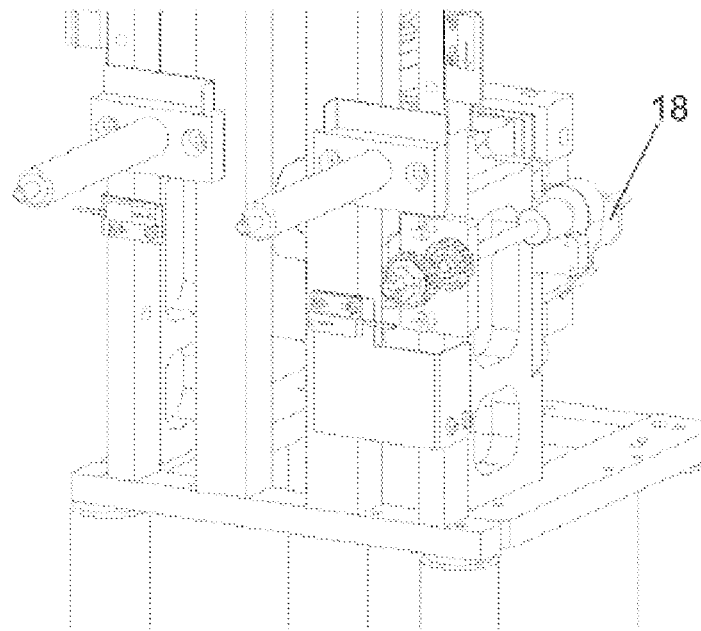
FIG. 6a is a perspective view of the drive motor of the filter cleaning assembly attached to the same.
Figure 6B:
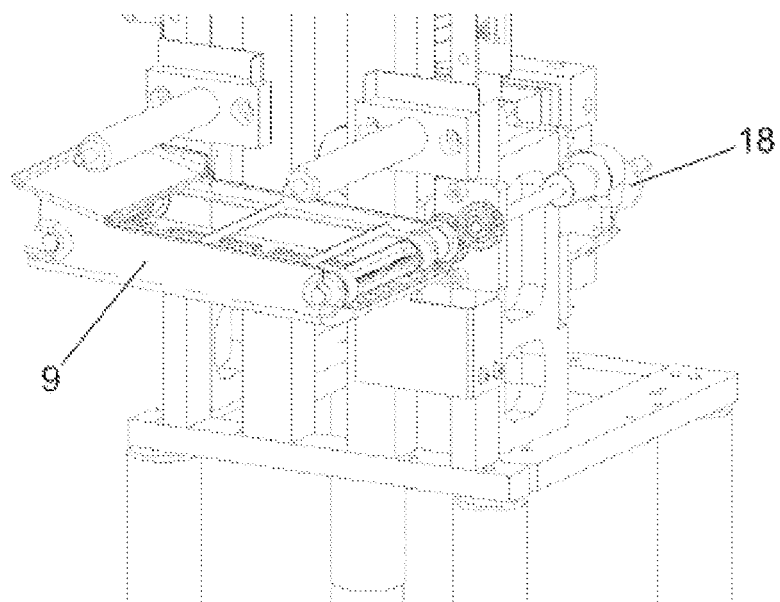

Preferably, and according to the above, the squeezing system has a third motor 18 which exclusively drives the filter cleaning assembly 9, and which is connected to the control unit, which is configured to independently control said third motor 18. FIG. 6 shows an example of the third motor 18 connected to the drive system of the filter cleaning assembly 9, formed in this case by gears, as can be seen in said FIG. 6, although depending on the embodiment, the transmission may be by gears, belts, or even the motor connected directly to the drive shaft 15 of the filter cleaning assembly 9.

According to different particular embodiments of the system, the control unit will be configured to stop the third motor 18 when the measured intensity is higher than a preset value.

Preferably, the control unit may vary the current intensity of the third motor 18, the speed it provides to the filter cleaning assembly 9, and the time that the filter cleaning assembly 9 operates.

Figure 7:
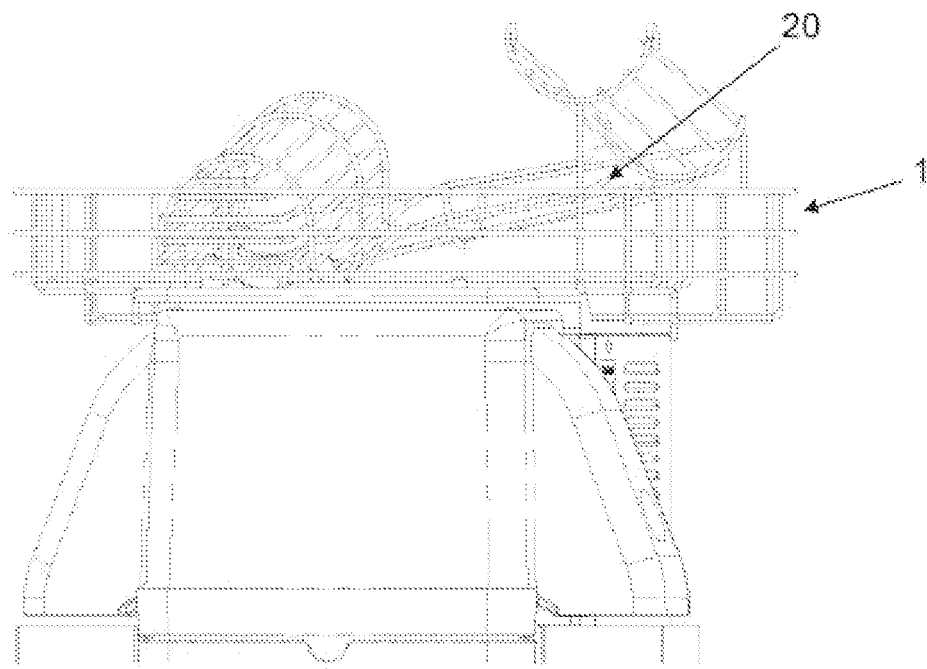
FIG. 7 shows an embodiment of the squeezing system with an alternative embodiment of the fruit feeding system consisting of a ramp and a dosing element.
Figure 8:
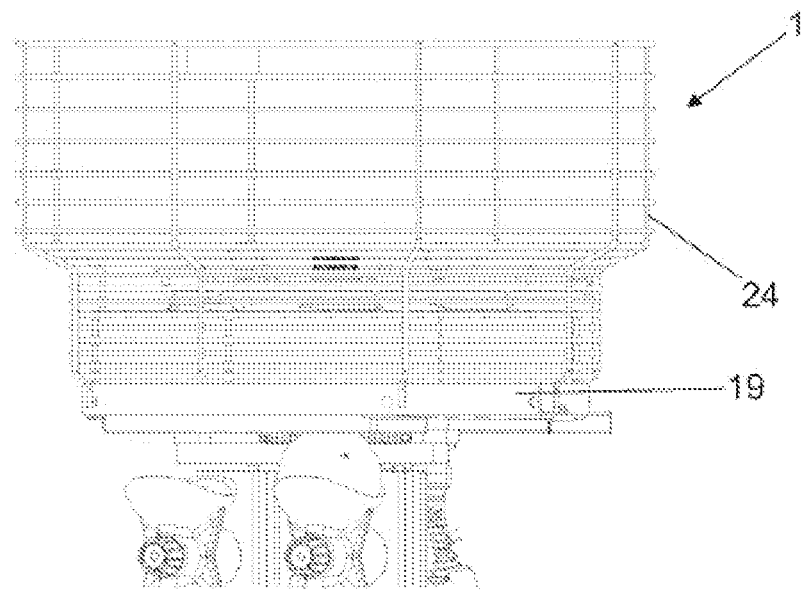
FIG. 8 shows a particular embodiment of the squeezing system with a fruit feeding system consisting of a basket and a turntable feeder.
Figure 9A:
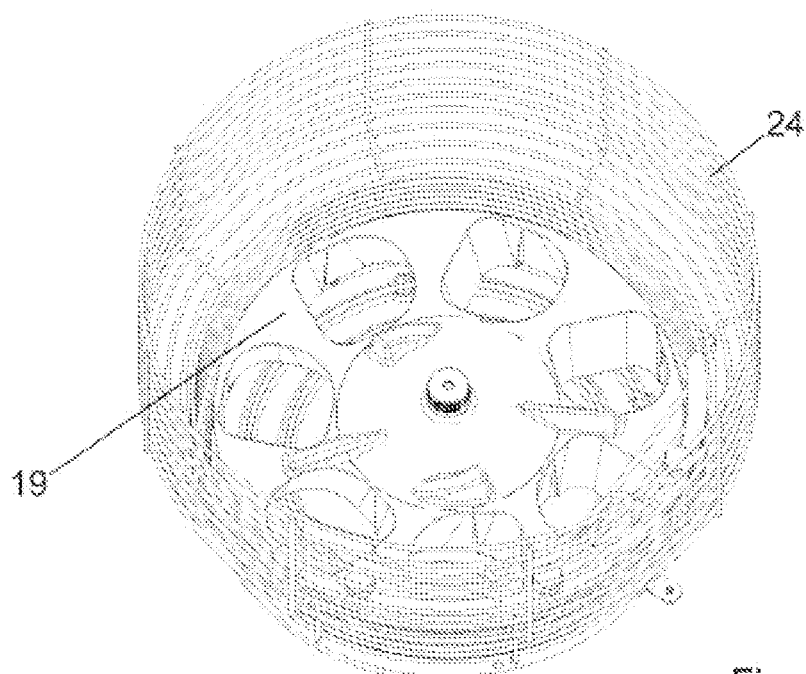
FIG. 9a shows a top perspective view of a particular embodiment of the feeding system of the present invention including basket feeder, turntable and its drive mechanism.
Figure 9B:
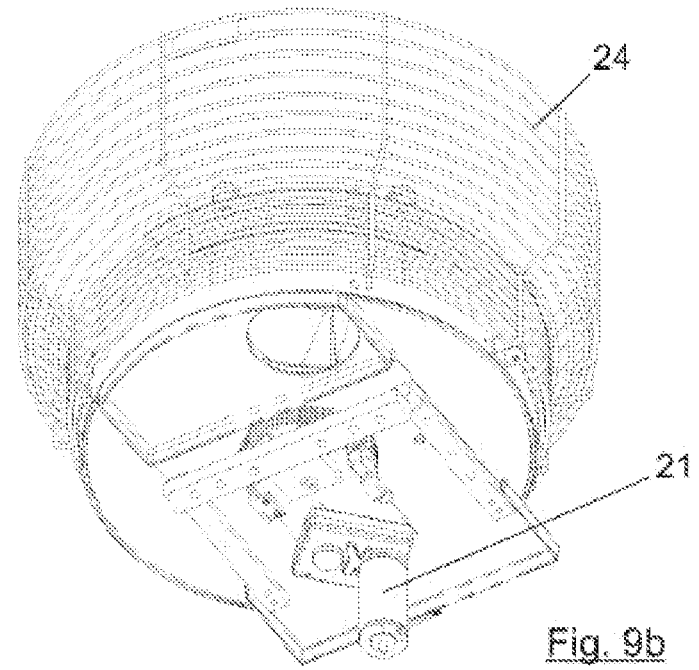

According to various particular embodiments of the invention, the fruit feeding system 12 may comprise a ramp 20 and a dosing element 22, as shown in FIG. 7, or a basket 24 and a turntable feeder 19, as shown in FIG. 8.

According to a preferred embodiment of the invention, the feeding system of the squeezing system has a turntable feeder 19, and a fourth motor 21 that exclusively drives said feeder 19. This fourth motor 21 is connected to the control unit, which is configured to independently control said fourth motor 21. FIG. 1a shows the fourth motor 21 and its arrangement in the system driving the turntable feeder 19 of the feeding system 1.

Alternatively, in the case of the feeding system 1 comprising the ramp 20 and the dosing element 22, the fourth motor 21 exclusively drives said dosing element 22, the control unit being configured to independently control said fourth motor 21, and with it the movement of the dosing element 22.

According to a preferred embodiment of the invention, the system presents a user-friendly and intuitive interface for the user, connected to the control unit, which is configured to select and adjust the operating time, speed and power of each of the motors 12,13,18,21 by the user, in order to be able to adapt the squeezing to different fruits and different needs, providing a versatile system adaptable to all kinds of circumstances.

FIGS. 10a, 10b, 10c, 10d and 10e show schematically the paths of the cups during the squeezing procedure according to different particular embodiments.

Figure 10A:
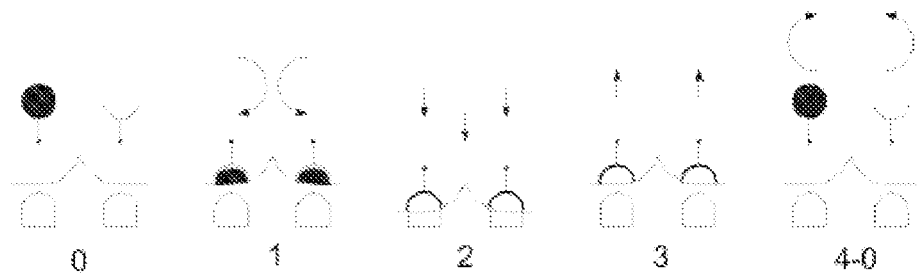

FIG. 10a shows an embodiment with a cup 3 in each assembly in a squeezing system with sufficient clearance for the cutting of the fruit 2 to occur in a single rotation of the cups 3 on the cutting and extraction assembly 4. In FIG. 10a, in the movement of transition from 0 to 1, the cups 3 rotate in opposite directions, towards the inside of the system, cut the fruit 2 by means of the rotating movement, and place the two halves in front of the squeezer balls 6. In the movement of transition from position 1 to 2, the cups 3 are lowered vertically. The cups 3 press the fruit 2 against the squeezer ball 6 to extract the juice. According to the above, this path is determined by the thickness of the peel of the fruit 2. The pressure to be applied for squeezing is the same and independent of the thickness of the peel of the fruit 2. The thicker the peel of the fruit 2, the shorter the path of the cups 3 will be (the first motor 12 will stop earlier due to the increase of the measured intensity when the pulp is no longer squeezed and the peel is squeezed) and the maximum pressure will be reached earlier, causing the direction of the vertical movement to be reversed and directed upwards. At this point, when this maximum pressure is reached, the cups 3 will stop pressing on the fruit 2, having squeezed out the pulp and not the peel. Subsequently, in the movement of transition from positions 2 to 3, the cups 3 move vertically upwards. Then, in the transition from positions 3 to 4, the cups 3 continue to rotate in the same direction, this time towards the outside of the system in order to eject the peels from the squeezing area into the trays (in a conventional and well-known way). At the end of this move the next fruit 2 drops and another cycle starts from 0.

Figure 10B:
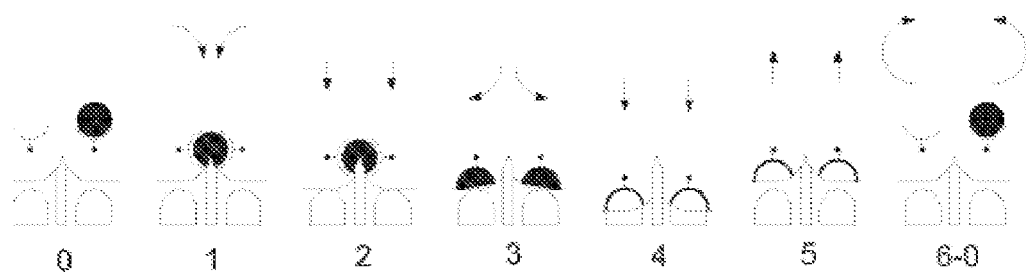

FIG. 10b shows an embodiment with one cup in each assembly where the cutting of the fruit occurs by turning and lowering the cups onto the cutting and extraction assembly. In the movement from positions 0 to 1, the cups 3 rotate in opposite directions, towards the inside of the system to put the fruit 2 in cutting position. Then, in the movement from positions 1 to 2, the cups 3 are lowered vertically so that the blade 5 makes an incision of a few cm in the fruit. Then, in the movement from 2 to 3, the cups 3 continue rotating in the same direction towards the inside of the system, the fruit 2 being completely cut by rotation and the halves being placed in front of the squeezer balls 6. In the movement from position 3 to 4, the cups 3 are lowered vertically. The cups 3 press the fruit 2 against the squeezer ball 6 to extract the juice. According to the above, this path is determined by the thickness of the peel of the fruit 2. The pressure to be applied for squeezing is the same and independent of the thickness of the peel of the fruit. The thicker the peel of the fruit 2, the shorter the path of the cups 3 will be (the first motor 12 will stop earlier due to the increase of the measured intensity when the pulp is no longer squeezed and the peel is squeezed) and the maximum pressure will be reached earlier, causing the direction of the vertical movement to be reversed and directed upwards. At this point, when this maximum pressure is reached, the cups 3 will stop pressing on the fruit 2, having squeezed out the pulp and not the peel. Subsequently, in the movement from positions 4 to 5, the cups 3 move vertically upwards. Then, in the transition from positions 5 to 6, the cups 3 continue to rotate in the same direction, this time towards the outside of the system in order to eject the peels from the squeezing area into the trays (in a conventional and well-known way). At the end of this movement the next fruit 2 drops and another cycle starts from position 0.

Figure 10C:
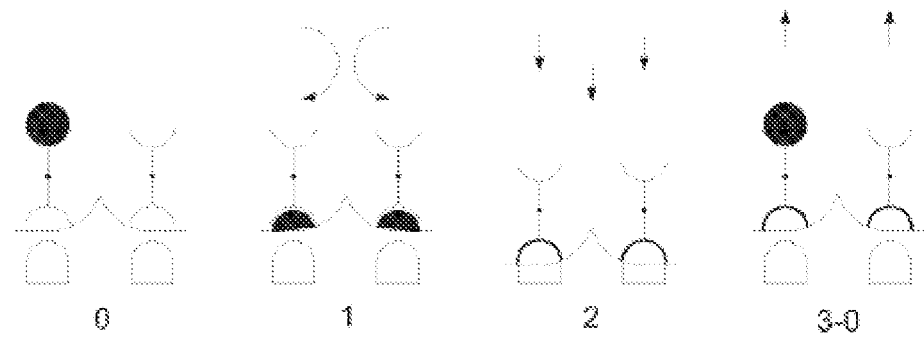
Figure 10D:
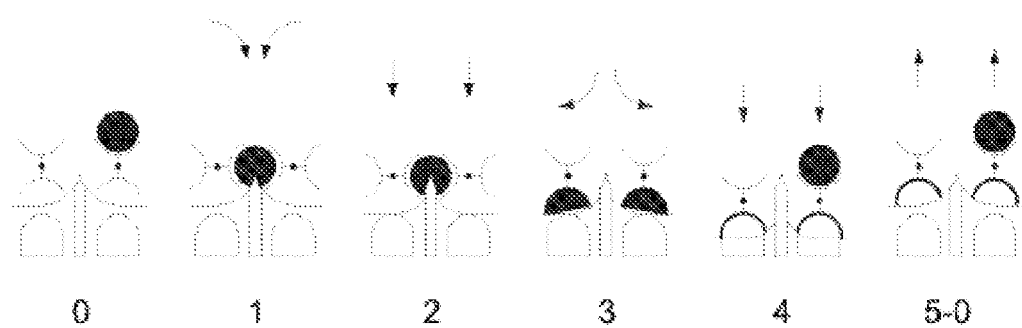
Figure 10E:
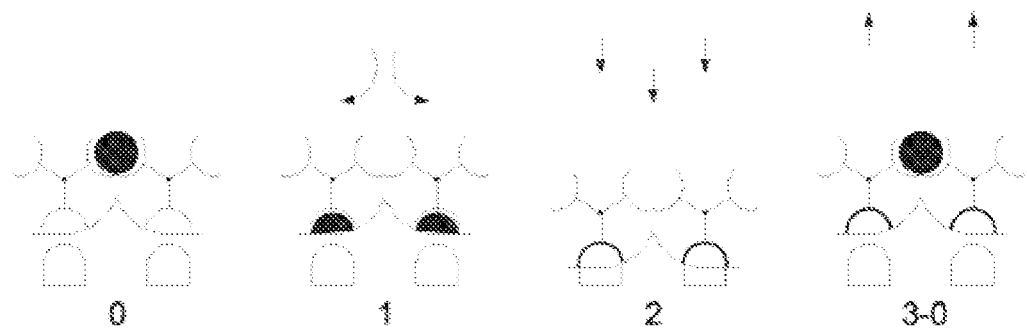

FIG. 10c shows the fruit cutting system of FIG. 10a, but with two cups in each assembly. FIG. 10d shows the fruit cutting system of FIG. 10b, but with two cups in each assembly. FIG. 10e shows the fruit cutting system of FIGS. 10a and 10c, but with three cups in each assembly. As for FIGS. 10c and 10e, in the movement from positions 0 to 1, the cups 3 rotate in opposite directions, towards the inside of the system, cut the fruit 2 by turning, and place the two halves in front of the squeezer balls 6, simultaneously, if there were peels in the cups 3 that were in front of the balls 6, by this movement they are expelled. In the movement from position 1 to 2, the cups 3 are lowered vertically. The cups 3 press the fruit 2 against the squeezer ball 6 to extract the juice. According to the above, this path is determined by the thickness of the peel of the fruit 2. The pressure to be applied for squeezing is the same and independent of the thickness of the peel of the fruit. The thicker the peel of the fruit 2, the shorter the path of the cups 3 will be (the first motor 12 will stop earlier due to the increase of the measured intensity when the pulp is no longer squeezed and the peel is squeezed) and the maximum pressure will be reached earlier, causing the direction of the vertical movement to be reversed and directed upwards. At this point, when this maximum pressure is reached, the cups 3 will stop pressing on the fruit 2, having squeezed out the pulp and not the peel. Subsequently, in the movement from positions 2 to 3, the cups 3 move vertically upwards, and during this movement the next fruit drops and another cycle starts from 0. These movements are fulfilled for both two-cup (FIG. 10c) and three-cup assemblies 3 (FIG. 10e) indistinctly. As to FIG. 10d, in the movement from the positions from 0 to 1, the cups 3 rotate in opposite directions, towards the inside of the system to put the fruit 2 in cutting position, at the same time, if there were peels in the cups 3 which are in front of the balls 6, they are ejected. Then, in the movement from positions 1 to 2, the cups 3 are lowered vertically so that the blade 5 makes an incision of a few cm in the fruit 2. Then, in the movement from positions 2 to 3, the cups 3 continue rotating in the same direction towards the inside of the system, making the complete cut of the fruit 2 by rotating the cups 3, and placing the halves in front of the squeezer balls 6. In the movement from position 3 to 4, the cups 3 are lowered vertically. The cups 3 press the fruit 2 against the squeezer ball 6 to extract the juice. According to the above, this path is determined by the thickness of the peel of the fruit 2. The pressure to be applied for squeezing is the same and independent of the thickness of the peel of the fruit. The thicker the peel of the fruit 2, the shorter the path of the cups 3 will be (the first motor 12 will stop earlier due to the increase of the measured intensity when the pulp is no longer squeezed and the peel is squeezed) and the maximum pressure will be reached earlier, causing the direction of the vertical movement to be reversed and directed upwards. At this point, when this maximum pressure is reached, the cups 3 will stop pressing on the fruit 2, having squeezed out the pulp and not the peel. Subsequently, in the movement from 4 to 5, the cups 3 move vertically upwards and during this movement, the next fruit 2 drops, and another cycle starts from 0.

These paths are for a particular embodiment of the system, so small variations in the embodiment of the components could result in small variations in these paths, without departing from the operation of the system.

Likewise, all these examples are possible with different squeezing sequences, which are made possible by having independent motors.

The invention claimed is:

1. A fruit squeezing system, comprising
a fruit feeding system,
cutting and squeezing means arranged under the fruit feeding system comprising
a pair of fruit receiving cup assemblies, vertically displaced by a vertical displacement means and rotating in opposite directions by a rotation means,
a cutting and extraction assembly under the pair of fruit receiving cup assemblies comprising
a central blade configured to cut the fruits into two halves, and
a peel extraction means after the fruit has been squeezed, and
a pair of fixed squeezer balls, each arranged under one of the pair of fruit receiving cup assemblies, configured to vertically squeeze for vertical squeezing of the fruit halves by vertical displacement of the pair of fruit receiving cup assemblies,
a first motor that exclusively drives the vertical displacement means of the pair of fruit receiving cup assemblies, the first motor having two directions configured to provide two directions of displacement of the vertical displacement means of the cup assemblies,
means for measuring a current intensity generated in the first motor by the driving of the vertical displacement means of the pair of fruit receiving cup assemblies, and
a control unit configured to independently control the first motor, the control unit being further configured to:
stop the first motor or change direction of the first motor when the measured current intensity is outside a preset range of values, and
vary the current intensity of the first motor and the speed of the vertical displacement means of the cup assemblies.

2. The fruit squeezing system according to claim 1, wherein the control unit is configured to stop the first motor when the measured current intensity is higher than a preset value.

3. The fruit squeezing system, according to claim 1, further comprising
a second motor that exclusively drives the rotation means of the pair of fruit receiving cup assemblies,
means for measuring current intensity generated in the second motor by the driving of the rotation means of the cup assemblies,
wherein the control unit is configured to independently control the second motor, the control unit being further configured to:
stop the second motor when the measured current intensity is higher than a preset value, and
vary the current intensity of the second motor and the speed of the rotation means of the cup assemblies.

4. The fruit squeezing system, according to claim 1, further comprising a tray for collecting the juice obtained from the fruit arranged under the cutting and squeezing means, which in turn comprises a filter for collecting pulp and seeds.

5. The fruit squeezing system according to claim 4, further comprising a filter cleaning assembly for cleaning the filter of the juice collection tray.

6. The fruit squeezing system according to claim 5, wherein the filter cleaning assembly comprises a mobile scraper mounted between two end shafts mounted on the filter, which in its movement along an entire length of the filter drags pulp and seeds to an outlet of the juice collection tray.

7. The fruit squeezing system according to claim 5, comprising a third motor that exclusively drives the filter cleaning assembly, wherein the control unit is configured to independently control said third motor.

8. The fruit squeezing system according to claim 7, wherein the control unit is configured to stop the third motor when a measured current intensity is higher than a preset value.

9. The fruit squeezing system according to claim 7, wherein the control unit is configured to control the current intensity and operating time of the third motor and the speed of the filter cleaning assembly.

10. The fruit squeezing system, according to claim 1, wherein the fruit feeding system further comprises
a basket with a separator and an actuating mechanism, configured to provide fruits to
a turntable feeder configured to receive the fruits from the basket and convey the fruits to the cups.

11. The fruit squeezing system according to claim 10, comprising a fourth motor that exclusively drives the turntable feeder of the feeding system, wherein the control unit is configured to independently control said fourth motor.

12. The fruit squeezing system according to claim 1, wherein the fruit feeding system further comprises
a ramp and
a dosing element configured to allow and close the passage of the fruits from the ramp to the cups.

13. The fruit squeezing system according to claim 12, comprising a fourth motor that exclusively drives the dosing element of the feeding system, wherein the control unit is configured to independently control said fourth motor.

14. The fruit squeezing system according to claim 1, further comprising an interface connected to the control unit configured to select and adjust the operating time, speed and power of each of the first, second, third and fourth motors.

* * * * *